US008564932B2

(12) United States Patent
Caumont et al.

(10) Patent No.: US 8,564,932 B2
(45) Date of Patent: Oct. 22, 2013

(54) DEVICE TO PREVENT OVERPRESSURE IN A CAPACITOR OR ULTRACAPACITOR

(75) Inventors: Olivier Caumont, Quimper (FR); Jean-Michel Depond, Quimper (FR); Arnaud Jourdren, Ergue-Gaberic (FR); Philippe Azais, Quimper (FR)

(73) Assignee: Batscap, Ergue-Gaberic (FR)

( * ) Notice: Subject to any disclaimer, the term of this patent is extended or adjusted under 35 U.S.C. 154(b) by 164 days.

(21) Appl. No.: 12/867,671

(22) PCT Filed: Feb. 13, 2009

(86) PCT No.: PCT/FR2009/000161
§ 371 (c)(1),
(2), (4) Date: Nov. 2, 2010

(87) PCT Pub. No.: WO2009/112718
PCT Pub. Date: Sep. 17, 2009

(65) Prior Publication Data
US 2011/0038101 A1 Feb. 17, 2011

(30) Foreign Application Priority Data
Feb. 14, 2008 (FR) ...................................... 08 00813

(51) Int. Cl.
*H01G 9/00* (2006.01)
(52) U.S. Cl.
USPC ......................................................... 361/502
(58) Field of Classification Search
None
See application file for complete search history.

(56) References Cited

U.S. PATENT DOCUMENTS

| 3,350,846 A | 11/1967 | Makrides et al. |
| 3,524,112 A | 8/1970 | Ruttkay et al. |
| 4,468,235 A | 8/1984 | Hill |
| 4,769,742 A * | 9/1988 | Nakajima et al. ............. 361/508 |
| 5,393,325 A * | 2/1995 | Edlund ............................. 95/56 |
| 6,233,135 B1 | 5/2001 | Farahmandi et al. |
| 6,800,392 B2 | 10/2004 | Jantsch et al. |
| 2001/0020416 A1 | 9/2001 | Yoshikawa et al. |
| 2002/0114958 A1 | 8/2002 | Ozeki et al. |

FOREIGN PATENT DOCUMENTS

DE 102005033476 1/2007

OTHER PUBLICATIONS

Review of Hydrogen Isotope Permeability Through Materials, by S.A. Steward, Lawrence Livermore National Laboratory, University of California, Aug. 15, 1983.
"Diffusion of hydrogen in copper-palladium alloys", J. Piper, J. Appl. Phys. vol. 37, 715-721, 1966.

(Continued)

Primary Examiner — Jayprakash N Gandhi
Assistant Examiner — Dion Ferguson
(74) Attorney, Agent, or Firm — Sofer & Haroun, LLP

(57) ABSTRACT

The present invention relates to a device to prevent overpressure in a supercapacitor. In a supercapacitor comprising a closed chamber fitted with means for exchanging a gas with the external surroundings and in which there are positioned two electrodes with a high specific surface area, separated by a separator, the separator and the electrodes being impregnated with an electrolyte, the means for exchanging a gas comprise a metallic membrane that is permeable to hydrogen and its isotopes and impermeable to gaseous species which have an effective cross section of 0.3 nm or higher, at a temperature of between −50° C. and 100° C.

23 Claims, 5 Drawing Sheets

(56) References Cited

OTHER PUBLICATIONS

"Hydrogen permeability measurement through Pd, Ni and Fe membranes," K. Yamakawa et al., J. Alloys and Compounds 321, 17-23, 2001.

"Catalytic membrane reactors for tritium recovery from tritiated water in the ITER fuel cycle", S. Tosti et al., Fusion Engineering and Design, vol. 49-50, 953-958, 2000)].

"Extractive Metallurgy of Niobium", C.K. Gupta, CRC Press, 1994).

"Hydrogen Permeability of Multiphase V-Ti-Ni Metallic Membranes", Report under Contract No. DE-AC09-96SR18500 with the U.S. Department of Energy, T. M. Adams, J. Mickalonis).

"V-Ni Alloy Membranes for Hydrogen Purification", Nishimura et al., JAC 330-332 (2002), pp. 902-906.

Search Report dated Feb. 13, 2010.

International Search Report dated Sep. 5, 2008.

"Investigation of Electromigration and Diffusion of Hydrogen in Palladium and PdAg Alloy", R. Pietrzak et al., Defect and Diffusion Forum, vol. 143-147, pp. 951-956, 1997.

http://www.rebresearch.com/H2perm2.htm (version used for this application).

* cited by examiner

DEVICE TO PREVENT OVERPRESSURE IN A CAPACITOR OR ULTRACAPACITOR

RELATED APPLICATIONS

This application is a National Phase application of PCT/FR2009/000161, filed on Feb. 13, 2009, which in turn claims the benefit of priority from French Patent Application No. 08 00813, filed on Feb. 14, 2008, the entirety of which are incorporated herein by reference

BACKGROUND

1. Field of the Invention

The present invention relates to supercapacitors, and more particularly to a device to prevent overpressure for a supercapacitor.

2. Description of Related Art

Various electrochemical devices, in particular supercapacitors, produce hydrogen during their operation.

A supercapacitor comprises two electrodes with a high specific surface area, between which a separator is placed, this assembly being placed in a closed chamber. The separator and the electrodes are impregnated with a solution of an ionic compound in a liquid solvent.

The supercapacitor generates gas during operation, which is essentially hydrogen. Buildup of the hydrogen formed in the supercapacitor causes an increase in the internal pressure, which is detrimental to the lifetime of the supercapacitor. An internal overpressure can degrade the supercapacitor by deformation, by opening or by explosion.

Various devices have been proposed in the prior art in order to remedy this problem.

Reversible degassing valves are used particularly in lead batteries, referred to as VRLA. They consist of a polymer membrane, in particular a polyethylene membrane. These membranes are not suitable for supercapacitors because they do not prevent entry of air into the device.

Various supercapacitors, in particular some marketed by the companies Maxwell or Epcos, are designed so that the casing has a weak zone which ruptures when the internal pressure exceeds a given threshold. Although such a device avoids any catastrophic behavior of the capacitor (in particular due to explosion), it nevertheless has the drawback of being irreversible and consequently does not allow the lifetime of the supercapacitor to be increased.

Reversible degassing valves exist on various supercapacitors marketed by the company Nippon-Chemicon. In these supercapacitors, the degassing valve comprises an elastomer seal held under pressure by a washer. The liquid of the electrolyte is propylene carbonate (PC) which is a liquid with low volatility, so as to prevent or at least limit deposition of the salt of the electrolyte in the valve. However, when the electrolyte is a salt in solution in a volatile solvent, for example acetonitrile, the risk of the valve being clogged by the salt increases significantly. In fact, a salt deposit at a valve will irreversibly lead to entry of air and water into the supercapacitor. It is well known that water and oxygen are highly reactive chemical species which rapidly degrade the properties of the electrolyte (and potentially the electrodes) thereby very rapidly leading to the end of life of the supercapacitor (U.S. Pat. No. 6,233,135).

The use of acetonitrile compared with propylene carbonate in a supercapacitor is desirable because an electrolyte in which the solvent is acetonitrile has a conductivity higher than that of an electrolyte in which the liquid solvent is PC. Furthermore, the generation of gas is greater over the course of time in the supercapacitor when the solvent is PC. However, the internal overpressure of a supercapacitor leads to its end of life by deformation, by opening or by explosion. For the same ageing conditions, a supercapacitor operating with an electrolyte based on PC therefore generally exhibits a shorter lifetime than when the electrolyte is based on acetonitrile.

DE-10 2005 033 476 describes a device which uses a polymer membrane with selective permeability. The membrane is a so-called "non-porous" membrane through which a gas can pass by diffusion, and not by direct passage. It is in particular a polymer membrane, in particular an EPDM membrane. The elasticity of such a polymer membrane makes it possible to attenuate strong productions of gas inside the device because the membrane can form a bubble, which increases the surface area for transfer to the outside, for example when an increase in temperature causes an increase in the production rate of the gas. However, polymer membranes do not prevent reverse diffusion of undesirable gases such as oxygen, water vapor, carbon monoxide and dioxide, nitrogen oxides or any other gas which is sufficiently small but detrimental to the ageing of supercapacitors which operate in an organic medium or in an aqueous medium.

Numerous metals exhibit permeability to hydrogen. When a membrane consisting of such a metal is placed in a gas flow containing hydrogen, the hydrogen gas dissociates in contact with the membrane's face exposed to the gas flow, the dissociated hydrogen diffuses through the membrane and recombines when it reaches the opposite face of the membrane, and molecular hydrogen escapes from the membrane.

Information relating to the selective permeability of various metals and metal alloys in relation to hydrogen and its isotopes can be found in the literature. In particular, mention may be made of "Review of Hydrogen Isotope Permeability Through Materials", by S. A. Steward, Lawrence Livermore National Laboratory, University of California, 15 Aug. 1983, which gives data associated with metals and metal alloys, in particular those in the table below.

| Metal | $\Phi_0$ (mol·m$^{-1}$·s$^{-1}$·Pa$^{-1/2}$) | $E_\Phi$ (K) | $\Phi_{25°C.}$ (mol·m$^{-1}$·s$^{-1}$·Pa$^{-1/2}$) | $\Phi_{70°C.}$ (mol·m$^{-1}$·s$^{-1}$·Pa$^{-1/2}$) |
|---|---|---|---|---|
| Aluminum[†] | 3 10$^{-5}$ | 14800 | 8.1 10$^{-27}$ | 5.5 10$^{-24}$ |
| Copper | 8.4 10$^{-7}$ | 9290 | 2.4 10$^{-20}$ | 1.4 10$^{-18}$ |
| Stainless Steel | 1 10$^{-7}$ | 8000 | 2.2 10$^{-19}$ | 7.4 10$^{-18}$ |
| Nickel | 3.9 10$^{-7}$ | 6600 | 9.4 10$^{-17}$ | 1.7 10$^{-15}$ |
| Palladium | 2.2 10$^{-7}$ | 1885 | 3.9 10$^{-10}$ | 9.0 10$^{-10}$ |

[†]Average value, depending on the surface quality;
$E_{\Phi\,max}$ = 18900 K.

U.S. Pat. No. 3,350,846 describes a method of recovering hydrogen by permeation through metallic membranes which allow selective diffusion of $H_2$. The membranes consist of Pd, a PdAg alloy, or alternatively they comprise a layer of a group VB metal (V, Ta, Nb) coated on each of its faces with a continuous non-porous film of Pd or an alloy of PdAg, PdAu or PdB. In a preferred embodiment, the membranes are heated to a temperature of between 300° C. and 700° C., a temperature range which is incompatible with an application of the supercapacitor type.

The site http://www.ceth.fr/sepmemfr.php describes a method of purifying a gas using a metallic membrane allowing hydrogen to be separated selectively from a gas mixture. The membrane is an all-metal composite membrane consisting of three layers. A very fine but dense layer of palladium constitutes the active part providing the selective permeability. It is supported by a thin metallic intermediate layer with fine pores, which makes it possible to ensure a very good holding of the dense palladium layer even at high levels of temperature or pressure. The intermediate layer is itself supported by a thicker porous metallic substrate. The hydrogen molecules which arrive in contact with the palladium layer are adsorbed and dissociated, and the elements resulting from the disassociation diffuse through the palladium layer and recombine when they desorb from the palladium.

U.S. Pat. No. 4,468,235 describes a method for extracting $H_2$ contained in a mixture of fluids by bringing the mixture of fluids (liquid or gaseous) in contact with a membrane consisting of a titanium alloy containing ~13% V, ~11% Cr and ~3% Al and carrying a metal selected from among Pd, Ni, Co, Fe, V, Nb or Ta, or an alloy containing one of these metals, on one of its faces.

Pd alloys, such as for example PdAg, PdCu, PdY, are considered to have good mechanical endurance to hydrogen and a permeability higher than that of palladium on its own (in particular $Pd_{75}Ag_{25}$). For example, U.S. Pat. No. 2,773,561 gives a comparison of the hydrogen permeability [expressed in $cm^3/s/cm^2$] of Pd and an alloy $Pd_{75}Ag_{25}$, which is summarized in the following table for membranes having a thickness of 25.4 μm.

| Pressure (MPa) | 450° C. | | 550° C. | |
| --- | --- | --- | --- | --- |
| | Pd | PdAg | Pd | PdAg |
| 0.69 | 0.71 | 1.22 | 1.08 | 1.41 |
| 1.38 | 1.23 | 1.93 | 1.86 | 2.32 |
| 2.07 | 1.68 | 2.56 | 2.42 | 2.99 |

It is furthermore known that for an alloy $Pd_{100-x}Cu_x$ in which x<30, the diffusion coefficient remains unchanged but the activation energy of the diffusion is about ⅓ that of Pd, and that the permeability Φ consequently increases, according to the equation $$\Phi = \Phi_0 e^{-\frac{E_\Phi}{T}},$$

in which $\Phi_0$ is a constant (in $mol.m^{-1}.s^{-1}.Pa^{-1/2}$), $E_\Phi$ (in kelvin) is the activation energy of the diffusion, and T is the temperature (in K) (cf. "*Diffusion of hydrogen in copper-palladium alloys*", J. Piper, J. Appl. Phys. Vol. 37, 715-721, 1966).

The hydrogen permeability of membranes consisting of Pd or Ni is described in particular in "*Hydrogen permeability measurement through Pd, Ni and Fe membranes,*" K. Yamakawa et al., *J. Alloys and Compounds* 321, 17-23, 2001.

Alloys based on palladium-silver are considered to exhibit efficient diffusion for hydrogen, in particular in "*Investigation of Electromigration and Diffusion of Hydrogen in Palladium and PdAg Alloy*", R. Pietrzak et al., *Defect and Diffusion Forum*, vol 143-147, 951-956, 1997).

Membranes consisting of alloys of Pd (PdAg, PdY) on a ceramic support are selective for the separation of hydrogen from a gas mixture. [Cf. "Catalytic membrane reactors for tritium recovery from tritiated water in the ITER fuel cycle", S. Tosti et al., Fusion Engineering and Design, Vol. 49-50, 953-958, 2000)].

U.S. Pat. No. 6,800,392 also describes the use of a membrane consisting of an alloy of Nb with from 5 to 25% of another metal selected from among Pd, Ru, Rh, Pt Au and Rh, the alloy membrane being obtained by colaminating films with different constituents. It is mentioned that the solubility of hydrogen in an alloy NbPd is about two times that of an alloy $PdAg_{23}$.

Niobium has a very high permeability and is considered as the material most permeable to hydrogen in the study by REB Research & Consulting available at http://www.rebresearch.com/H2perm2.htm, from which FIG. 1 representing the permeability P in $mol/mPa^{1/2}s$ as a function of $1/T$ ($K^{-1}$) is taken.

A permeability value of 3.2 $10^{-7}$ $mol.m^{-1}.s^{-1}.Pa^{-1/2}$ at 425° C. is furthermore put forward in Journal of Membrane Science, Vol. 85, 29-38, 1993. These properties, however, do not seem to be as beneficial at the temperatures at which supercapacitors operate (<100° C.). In particular, hydrogen forms a compound with niobium which is stable at low temperature, which mechanically weakens the niobium and limits the diffusion of hydrogen (cf. "Extractive Metallurgy of Niobium", C. K. Gupta, CRC Press, 1994). Furthermore, niobium oxidizes very easily at room temperature. A barrier layer against the entry of hydrogen into the material is then formed on the surface. At room temperature, it is the phenomenon of an adsorption which most limits the diffusion of hydrogen through a niobium membrane. This is why the majority of authors publishing work on niobium report having worked with niobium covered with a very thin layer of palladium (thickness <1 μm): the palladium avoids the surface oxidation problems (its oxide is immediately reduced in the presence of hydrogen) and promotes the adsorption of hydrogen.

These reservations also apply to tantalum and vanadium. Although these materials seem beneficial at high temperature (>400° C.), at lower temperatures they have the same deficiencies as niobium: oxidation layer, weakening linked with the formation of stable metal-$H_x$ compounds, low adsorption power. Here again, specialists generally recommend depositing a thin layer of palladium on the surface of the material for correct operation.

V—Ti—Ni alloys have a high hydrogen permeability, in particular the alloy $V_{53}Ti_{26}Ni_{21}$ whose permeability is 1.0-3.7 $10^{-9}$ $mol.m^{-1}.s^{-1}.Pa^{-1/2}$: at 22° C., which is a value higher than that of palladium, namely 3.3-4.3 $10^{-10}$. (Cf. "*Hydrogen Permeability of Multiphase V—Ti—Ni Metallic Membranes*", Report under Contract No. DE-AC09-96SR18500 with the U.S. Department of Energy, T. M. Adams, J. Mickalonis).

OBJECTS AND SUMMARY

Membranes of V-15% Ni-0.05% Ti or V-15% Ni-0.05% Y with a thin deposit of palladium have highly beneficial permeability values (6 $10^{-8}$ $mol.m^{-1}.s^{-1}.Pa^{-1/2}$ at 200° C.). However, a decrease of this value with time is observed (−30% after one week) which could limit their benefit for long-term applications such as the one envisaged in the present document. (Cf. "V—Ni Alloy Membranes for Hydrogen Purification", Nishimura et al., JAC 330-332 (2002), pp 902-906).

It is an object of the present invention to provide a device which allows the hydrogen formed inside a supercapacitor to be removed rapidly and selectively, while preventing the passage of any other gas from the outside to the interior of the supercapacitor.

BRIEF DESCRIPTION OF THE DRAWINGS:

The present invention can be best understood through the following description and accompanying drawings, wherein.

Figure 1:
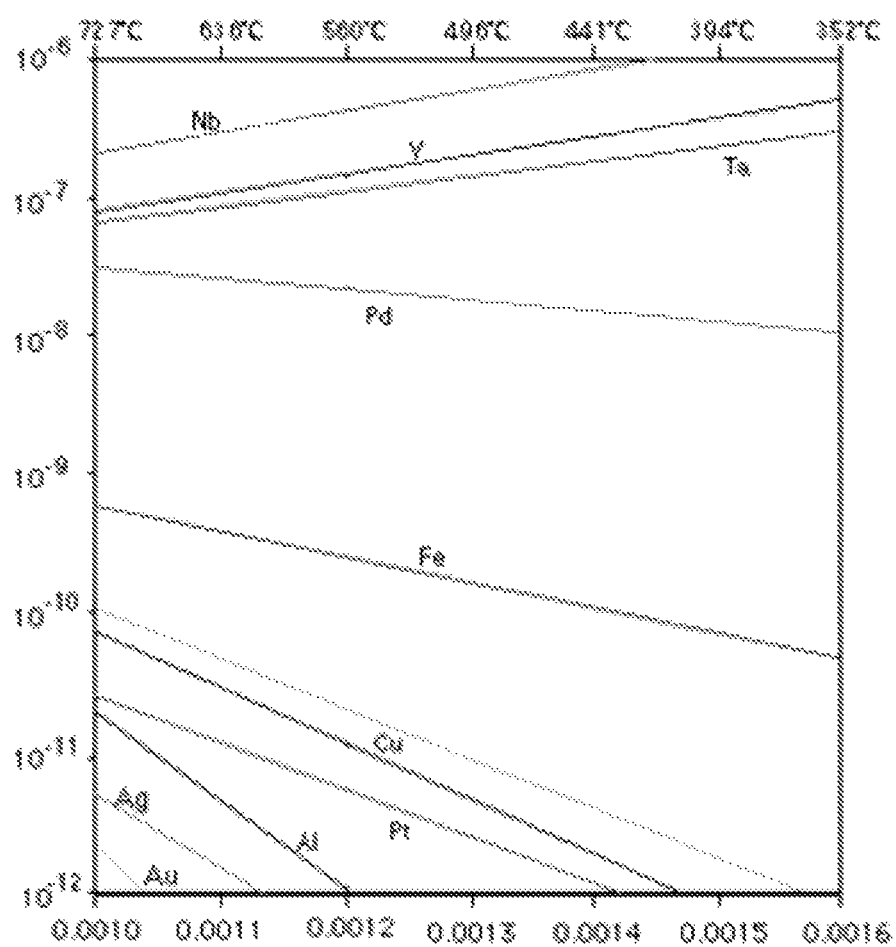
FIG. 1 represents the permeability P of Niobium in mol/mPa$^{1/2}$s as a function of 1/T (K$^{-1}$)

DETAILED DESCRIPTION:

This object is achieved by using a membrane which is selectively permeable to H$_2$, with a high diffusion rate.

A supercapacitor according to the invention comprises a closed chamber which is equipped with means for exchanging a gas with the external environment and in which two electrodes with a high specific surface area are placed while being separated by a separator, the separator and the electrodes being impregnated with an electrolyte. The supercapacitor is characterized in that the means for exchanging a gas comprise a membrane which is permeable to hydrogen and its isotopes and impermeable to other gas species which are in the form of entities having a cross section greater than or equal to 0.3 nm at the operating temperatures of supercapacitors, namely between −50° C. and 100° C.

A membrane used in a supercapacitor according to the invention has a surface area S (in m$^2$) and a thickness (in m), and it consists of a material which is selected from among metals and metal alloys and the intrinsic permeability Φ of which (in mol.m$^{-1}$.s$^{-1}$Pa$^{-1/2}$) is selective with respect to hydrogen or its isotopes and has a value such that $10^{-15}$ mol.s$^{-1}$.Pa$^{-1/2}$≤(Φ*S)/e≤$10^{-9}$ g mol.s$^{-1}$.Pa$^{-1/2}$, preferably $10^{-12}$ mol.s$^{-1}$.Pa$^{-1/2}$≤(Φ*S)/e≤5. $10^{-10}$ mol.s$^{-1}$.Pa$^{-1/2}$.

A material which satisfies the following Equation 1:

$$10^{-15}\,\text{mol.s}^{-1}.\text{Pa}^{-1/2} \leq (\Phi*S)/e \leq 10^{-9}\,\text{mol.s}^{-1}.\text{Pa}^{-1/2} \qquad \text{Eq. 1}$$

defined above makes it possible to produce a membrane whose surface area is compatible with the dimensions of the supercapacitor.

In general, the permeability Φ (in mol.m$^{-1}$.s$^{-1}$.Pa$^{-1/2}$) depends on the nature of the gas/membrane pairing. Experimental measurements show that Φ generally follows a law of the Arrhenius type $$\Phi = \Phi_0 e^{-\frac{E_\Phi}{T}} \qquad \text{Eq. 2}$$

in which $\Phi_0$ is a constant (in mol.m$^{-1}$.s$^{-1}$.Pa$^{-1/2}$), $E_\Phi$ (in kelvin) is the activation energy of the diffusion, and T is the temperature (in K).

As indicated above, membranes are known which consist of a metallic material capable of adsorbing hydrogen and diffusing it. Among the numerous metallic materials, however, the majority cannot be used as an element to prevent overpressure in a supercapacitor because they have at least one of the following drawbacks: insufficient diffusion rate, lack of mechanical strength after adsorbing hydrogen, difficulty of feasibility with thicknesses ad hoc, loss of properties in the course of time, cost. Intensive tests have been carried out by the inventors in order to select, from among the materials capable of adsorbing and diffusing hydrogen selectively, those which make it possible to use a membrane having a surface area compatible with the conventional dimensions of supercapacitors, and in particular materials which satisfy the relation:

$$10^{-15}\,\text{mol.s}^{-1}.\text{Pa}^{-1/2} < \Phi*S/e < 10^{-9}\,\text{mol.s}^{-1}.\text{Pa}^{-1/2}$$

The materials which fulfill the aforementioned criteria comprise metallic materials in which the metals are selected from among Pd, Nb, V, Ta, Ni and Fe, and metal alloys of a metal selected from among Pd, Nb, V et Ta and at least one other metal selected from among Pd, Nb, V, Ta, Fe, Al, Cu, Ru, Re, Rh, Au, Pt, Ag, Cr, Co, Sn, Zr, Y, Ni, Ce, Ti, Ir, and Mo.

The membrane of a supercapacitor according to the invention may have various shapes, irrespective of the material from which it is made.

It may in particular be self-supported or non-self-supported. In the event that it is self-supported, it preferably has a thickness greater than or equal to 5 μm.

In one embodiment, the membrane is a self supported membrane. This embodiment is particularly beneficial for materials which have a very large intrinsic selective permeability for hydrogen, and which can consequently have a thickness sufficient to ensure mechanical strength while guaranteeing compliance with Equation 1.

Figure 2:
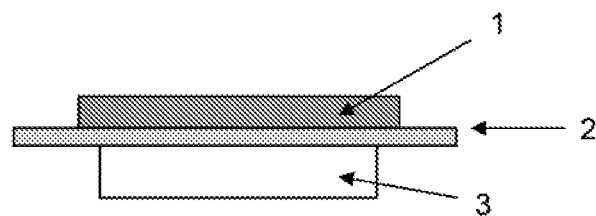
FIG. 2 illustrates a membrane of a supercapacitor according to one embodiment.

When the membrane consists of a material whose intrinsic permeability requires the thickness to be reduced to a value which no longer provides the membrane with sufficient mechanical strength, the membrane may be laid on a support layer or placed between two support layers. The support layers consist of a material which has a very high permeability to hydrogen, this permeability not being selective. The multilayer structure is such that the limits of the support layer or support layers do not extend beyond the limits of the membrane. A multilayer structure is represented in FIG. 2. The layer 2 constitutes the selective membrane. The layers 1 and 3 constitute the support layers. The surface area of the layer 2 must be greater than the surface layer of the support layer or each of the support layers, so that no gas can pass through a support layer without also passing through the selective membrane. When the membrane is placed between two support layers, these layers may consist of the same hydrogen-permeable material, or alternatively the material forming one of the support layers may be different from the material forming the other layer. The hydrogen-permeable material without selectivity may be selected from among polymers, ceramics, carbon and metals.

The selectively permeable membrane, as well as the support layers, may consist of a sintered material.

According to a particular embodiment of the invention, at least one additional layer is a sintered material having a thickness of more than 0.3 mm (which makes it capable of withstanding a pressure of more than 2 bar) and the membrane is a membrane made of palladium or a palladium-silver alloy having a thickness of from 0.03 μm to 10 μm and a surface area of from 0.0015 mm² to 10 mm², and the ratio S/e varies from 0.05 mm²/μm to 1 mm²/μm.

The material of the additional, hydrogen-permeable layer or layers may also be a polymer or a mixture of polymers preferably having a thickness of more than 0.005 mm, which makes it capable of withstanding a maximum pressure of 2.5 bar. In this case, the membrane is a membrane made of palladium or a palladium-silver alloy having a thickness of from 0.03 μm to 1 μm and a surface area of from 0.003 mm² to 1 mm², and the ratio S/e varies from 0.09 mm²/μm to 1 mm²/μm.

According to a particular embodiment, the hydrogen-permeable material of the additional layer or layers is a metal or a metal alloy, the membrane has a surface area of from 0.0007 mm² to 100 mm² and a thickness of from 0.03 μm to 10 μm, and the ratio S/e varies from 0.025 mm²/μm to 0.1 mm²/μm. The hydrogen-permeable material of the additional layer or layers may in particular be palladium. In this case, the membrane has a surface area of from 0.0015 mm² to 1 mm², a thickness of 0.03 μm to 10 μm and the ratio S/e varies from 0.05 mm²/μm to 0.1 mm²/μm.

A particularly preferred self supported membrane has a surface area of between 0.15 mm² and 100 mm² and a thickness of from 5 μm to 100 μm, and the ratio S/e varies from 0.03 mm²/μm to 1 mm²/μm.

In the case of a self supported membrane, that is to say one having a thickness of more than 5 μm, an appropriate metallic material may be selected from among Pd, Nb, V and Ta. For any metal other than Pd, however, a continuous thin (thickness<1 μm) protective layer of Pd should be applied on each of the faces of the membrane. Thus, according to a particular embodiment of the invention, the membrane consists of a film of a metal selected from among Nb, V and Ta having a thickness greater than or equal to 5 μm, placed between two continuous palladium films having a thickness of less than 1 μm. These palladium films may be deposited by the conventional techniques of chemical, physical or electrochemical deposition (CVD, PVD, electrochemical deposition) which ensure a continuous and regular deposit.

In a particular embodiment, the metallic membrane is self supported and consists of palladium, it has a surface area of between 0.25 mm² and 10 mm² and a thickness of greater than or equal to 5 μm, preferably from 5 μm to 100 μm, and the ratio S/e varies from 0.05 mm²/μm to 0.1 mm²/μm. A membrane having a thickness of 25 μm, a surface area of 1.5 mm² and a ratio S/e of 0.06 mm²/μm is more particularly preferred.

In the case of a non-self supported membrane (thickness<5 μm), an appropriate metallic material may be selected from among Pd, Nb, V, Ta, Ni and Fe. For any metal other than Pd or Ni, however, a continuous thin (thickness<1 μm) protective layer of Pd should be applied on each of the faces of the membrane. Thus, according to a particular embodiment of the invention, the membrane consists of a film of a metal selected from among Nb, V, Ta and Ta having a thickness less than 5 μm, placed between two continuous palladium films having a thickness of less than 1 μm. According to another embodiment, the membrane consists of a film of palladium or nickel having a thickness of less than 5 μm. As for the self supported membranes, the palladium may be deposited by the conventional deposition techniques.

Membranes may furthermore be mentioned which consist of an alloy of a metal selected from among Pd, Nb, V, Ta and at least one metal selected from among Pd, Nb, V, Ta, Fe, Al, Cu, Ru, Re, Rh, Au, Pt, Ag, Cr, Co, Sn, Zr, Y, Ni, Ce, Ti, Ir and Mo. The alloys $Pd_{75}Ag_{25}$, $Pd_{92}Y_8$, $Pd_{93.5}Ce_{6.5}$, $Pd_{60}Cu_{40}$, $V_{85}Ni_{15}$ stabilized with 0.05% yttrium or titanium, $V_{53}Ti_{26}Ni_{21}$, $V_{50}Nb_{50}$, $V_{13}Cr_{11}Al_3Ti_{73}$ (titanium alloy VC120), $Nb_{56}Ti_{23}Ni_{21}$, $Nb_{68}Ti_{17}Ni_{15}$ and $Nb_{99}Zr_1$ have particularly high permeabilities. For example, the alloy V53Ti26Ni21 has a constant $\Phi_0$ of from 1.3 to $3.7 \cdot 10^{-9}$ mol.m$^{-1}$.s$^{-1}$.Pa$^{-1/2}$.

The chamber of a supercapacitor comprises a cylindrical side wall closed at each of its ends by a lid. The side wall is generally in the form of a cylinder with a substantially circular base. The lids consist of a conductive material, generally a metallic material, and they are electrically insulated from one another. If the side wall is a nonconductive material, it serves as an insulator between the lids. If the side wall consists of a metallic material, it is fixed to at least one of the two lids by an insulating seal or an insulating adhesive. It is also possible for one of the two lids and the side wall to form a single part.

The membrane is fixed to the supercapacitor by various means selected as a function of the means for exchanging a gas, with which the supercapacitor is fitted. Nevertheless, the membrane and its fastening system in no way alter the hermeticity of the chamber of the supercapacitor for substances other than hydrogen.

When the means for exchanging a gas are in the form of an opening in the chamber, and the membrane is a pellet of metal or a metal alloy, it may be fixed on the chamber around said opening by welding, by brazing, by diffusion brazing or by crimping.

A membrane in the form of a pellet may furthermore be forcibly inserted into the means for exchanging a gas.

The membrane may be in the form of a metal tube closed at one of its ends, open at the other end and placed in the chamber so that its open end is fixed to the means for exchanging a gas, for example by insulating seals or by adhesive bonding with the aid of an insulating material.

When the structure of the membrane comprises a polymer support layer, it may be fixed on the gas exchange means by sealing, adhesive bonding or crimping. However, the selectively permeable membrane must at least cover the opening of the chamber.

The material constituting the membrane, as well as the dimensions of the membrane which are required for a given supercapacitor, may be determined by the person skilled in the art, in particular with the aid of the following data.

Internal pressure measurements on a supercapacitor without a leak have shown that the internal pressure P (in Pa) increases proportionally to the ageing time t according to Equation 3, in which k is a constant that depends on the temperature and the ageing voltage:

$$P(t) = k\,t \qquad \text{Eq. 3}$$

Since hydrogen can be regarded as an ideal gas at the pressures in question, the following relation applies in which $V_1$ is the free volume inside the supercapacitor (in m³), $n_{H2\,gas}$ is the quantity of hydrogen gas (in mol) in the free volume $V_1$, R is the ideal gas constant (R=8.314 S.I.) and T is the temperature (in K):

$$P(t)V_1 = n_{H2\,gas}(t) R\,T \qquad \text{Eq. 4}$$

A supercapacitor may furthermore contain a material which has hydrogen adsorption properties, for example activated carbons. The following relation is conventionally observed, in which $m_{ads}$ is the mass (in g) of material which can adsorb hydrogen, $n_{H2\,ads}$ is the quantity of hydrogen gas adsorbed (in mol) and $\xi$ is a constant which depends on the temperature:

$$n_{H2\,ads}(t) = \xi m_{ads} P(t) \qquad \text{Eq. 5}$$

The quantity of hydrogen produced during ageing in a capacitor without a leak, denoted $n_{H2}$, is therefore proportional to P, and therefore to the time t, according to the following relation:

$$n_{H2}(t) = n_{H2\ gas}(t) + n_{H2\ ads}(t) = \left(\frac{V_1}{RT} + \xi m_{ads}\right) P(t) = \alpha t \quad \text{Eq. 6}$$

The constant α depends on the temperature and the operating voltage of the supercapacitor, but it is not linked with the existence or absence of a selective leak of hydrogen through the casing of the supercapacitor.

In the case of a supercapacitor equipped with a membrane, a part of $n_{H2}$, denoted $n_{H2\ diff}$, diffuses through the membrane:

$$n_{H2}(t) = n_{H2\ gas}(t) + n_{H2\ ads}(t) + n_{H2\ diff}(t) \quad \text{Eq. 7}$$

Fick's 1$^{st}$ law gives the value of the flow rate $$-\frac{dn_{H2\ diff}}{dt}$$

through the membrane as a function of the surface area $S_m$ and the thickness $e_m$ of the membrane, as well as the intrinsic permeability Φ of the material which constitutes the membrane, according to the equation:

$$\frac{dn_{H2\ diff}}{dt} = \phi \frac{S_m}{e_m} \sqrt{P(t)} \quad \text{Eq. 8}$$

Differentiating Equation 7 gives a differential equation (Eq. 9) which, when solved, provides the variation, over time of the internal pressure in the supercapacitor equipped with a membrane (Eq. 8) (with the initial condition P=0 at t=0):

$$\frac{dn_{H2}}{dt} = \left(\frac{V_1}{RT}\right)\frac{dP}{dt} + \xi m_{ads}\frac{dP}{dt} + \phi\frac{S_m}{e_m}\sqrt{P(t)} = \alpha \quad \text{Eq. 9}$$

$$-2\frac{\frac{V_1}{RT} + \xi m_{ads}}{\phi\frac{S_m}{e_m}}\left[\sqrt{P(t)} + \frac{\alpha e_m}{\phi S_m}\ln\left(1 - \frac{\phi S_m}{\alpha e_m}\sqrt{P(t)}\right)\right] = t \quad \text{Eq. 10}$$

Equation 10 makes it possible to determine the limiting pressure value inside the supercapacitor equipped with a membrane when the time tends to infinity:

$$t \to \infty \Leftrightarrow 1 - \frac{\phi S_m}{\alpha e_m}\sqrt{P} \to 0 \Rightarrow P_{lim} = \left(\frac{\alpha e_m}{\phi S_m}\right)^2 \quad \text{Eq. 11}$$

Equation 10 also makes it possible to calculate the characteristics of the membrane as a function of the desired lifetime FdV of the supercapacitor and the maximum allowable pressure $P_{max}$, knowing that $P_{max} < P_{lim}$:

$$-2\frac{\frac{V_1}{RT} + \xi m_{ads}}{\phi\frac{S_m}{e_m}}\left[\sqrt{P_{max}} + \frac{\alpha e_m}{\phi S_m}\ln\left(1 - \frac{\phi S_m}{\alpha e_m}\sqrt{P_{max}}\right)\right] = FdV$$

The present invention is illustrated by the following exemplary embodiments to which, however, it is not limited.

EXAMPLE 1

A membrane was calculated, for a supercapacitor having a capacitance of 2600 F which has the following characteristics:

- The chamber of the supercapacitor consists of a cylindrical metal wall closed by two conductive lids, which form the poles of the supercapacitor and are insulated from the metal wall by an insulating material;
- The chamber has a diameter of 7 cm and a height of 10 cm;
- The free volume $V_1$ inside the supercapacitor is 50 cm$^3$;
- The electrolyte is a 1 M solution of tetraethylammonium tetrafluoroborate (TEABF$_4$) in acetonitrile;
- The separator is a cellulose film with a thickness of 25 μm placed between two electrodes, each consisting of an aluminum sheet carrying a layer of activated carbon, the separator being in contact with the carbon layer of each electrode, and this assembly being rolled up, the activated carbon having a total mass of 100 g, this material furthermore constituting the mass $m_{ads}$ of hydrogen-adsorbing material inside the supercapacitor, the adsorption efficiency ξ of which is 0.1 mmol.g$^{-1}$.bar$^{-1}$;
- One of the electrodes is connected to one of the lids of the chamber, and the other electrode is connected to the other lid of the chamber;
- The operating temperature T is 70° C.;
- The ageing is determined under a constant voltage of 2.7 V, which corresponds to a factor α of 0.15 mmol.h$^{-1}$;
- The desired lifetime FdV is 2000 hours;
- The maximum allowable pressure $P_{max}$ inside the supercapacitor is from 1 to 7 bar.

Palladium Membrane

If the material adopted for the membrane is palladium, Equation 2 becomes:

$$\Phi = 2.2 \cdot 10^{-7} e^{-\frac{1885}{T+273}} \text{mol} \cdot m^{-1} \cdot s^{-1} \cdot Pa^{-\frac{1}{2}}$$

For a supercapacitor operating at 70° C., Φ is $9.10^{-10}$ mol.m$^{-1}$.s$^{-1}$.Pa$^{-1/2}$.

Figure 3:
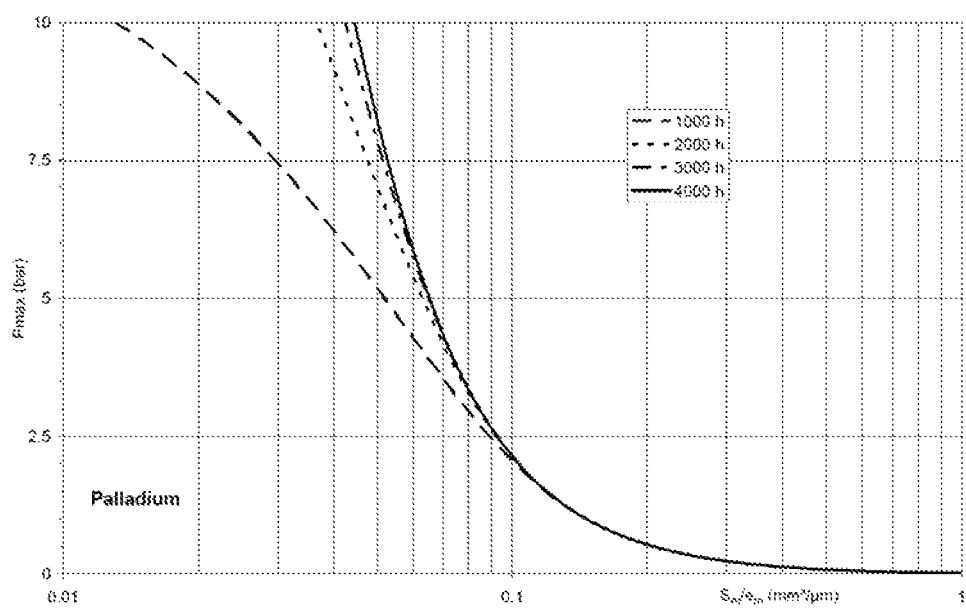
FIG. 3 shows a nomogram which gives the ratio $S_m/e_m$ (in mm$^2$.μm$^{-1}$) for a palladium membrane as a function of the maximum allowable pressure $P_{max}$ (in bar) and the desired lifetime FdV (in h)

FIG. 3 shows a nomogram which gives the ratio $S_m/e_m$ (in mm$^2$.μm$^{-1}$) for a palladium membrane as a function of the maximum allowable pressure $P_{max}$ (in bar) and the desired lifetime FdV (in h).

This FIG. 3 shows that a palladium membrane having a surface area of the order of several mm$^2$ and a thickness of the order of one hundred μm (ratio S/e of the order of 0.05 mm$^2$/μm) makes it possible to obtain the desired result. A membrane of this type can be produced mechanically when the supercapacitor contains a material that adsorbs hydrogen.

By way of comparison, the use of an aluminum membrane and a steel membrane was considered.

Aluminum Membrane

If the material adopted for the membrane is aluminum, Equation 2 becomes:

$$\Phi = 3 \cdot 10^{-5} e^{-\frac{14800}{T+273}} \text{mol} \cdot m^{-1} \cdot s^{-1} \cdot Pa^{-\frac{1}{2}}$$

For a supercapacitor operating at 70° C., Φ is $5.5.10^{-24}$ mol.m$^{-1}$.s$^{-1}$.Pa$^{-1/2}$.

Figure 5:
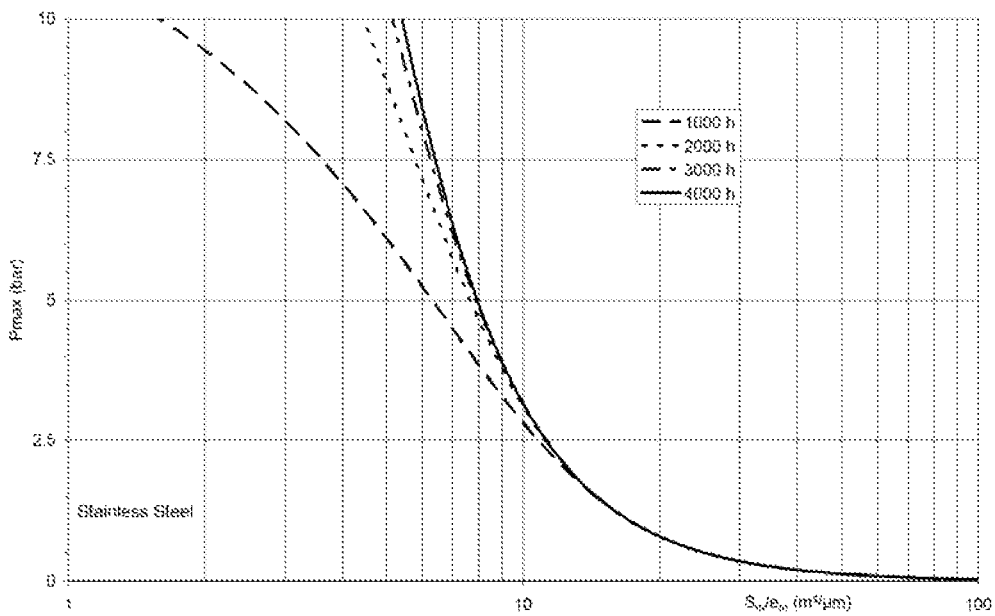
FIG. 5 shows a nomogram which gives the ratio $S_m/e_m$ (in mm$^2$.μm$^{-1}$) for an aluminum membrane as a function of the maximum allowable pressure $P_{max}$(in bar) and the desired lifetime FdV (in h).

FIG. 5 shows a nomogram which gives the ratio $S_m/e_m$ (in mm$^2$.μm$^{-1}$) for an aluminum membrane as a function of the maximum allowable pressure $P_{max}$ (in bar) and the desired lifetime FdV (in h).

This figure shows that an aluminum membrane would require a surface area of the order of several km$^2$ with a thickness of the order of one μm, to obtain the desired result. Such a membrane cannot therefore be envisaged in practice in a supercapacitor.

Steel Membrane

If the material adopted for the membrane is steel, Equation 2 becomes:

$$\Phi = 1 \cdot 10^{-7} e^{-\frac{8000}{T+273}} \text{mol} \cdot m^{-1} \cdot s^{-1} \cdot \text{Pa}^{-\frac{1}{2}}$$

For a supercapacitor operating at 70° C., Φ is $7.4 \cdot 10^{-18}$ mol.m$^{-1}$.s$^{-1}$.Pa$^{-1/2}$.

Figure 4:
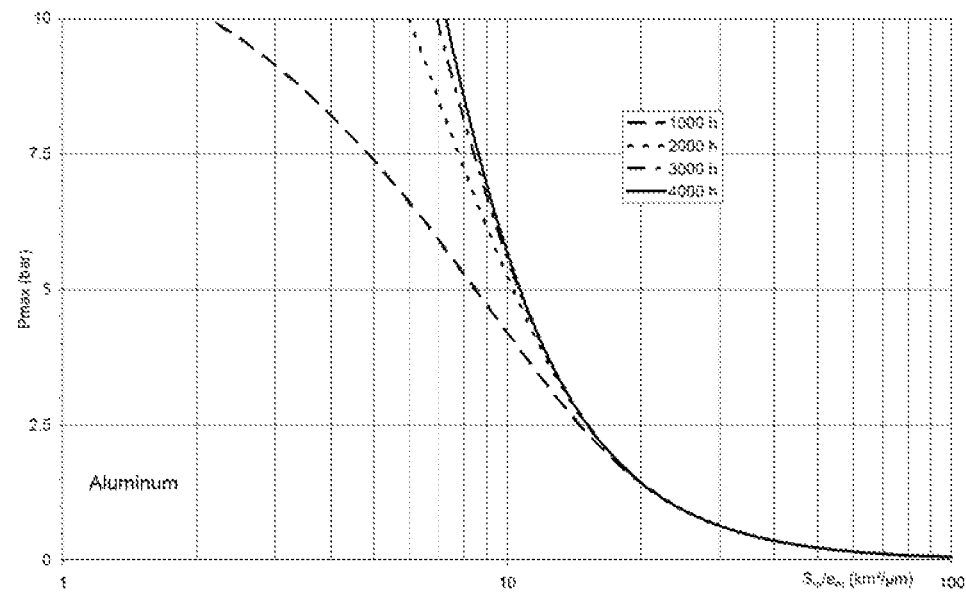
FIG. 4 shows a nomogram which gives the ratio $S_m/e_m$ (in mm$^2$.μm$^{-1}$) for stainless steel membrane as a function of the maximum allowable pressure $P_{max}$ (in bar) and the desired lifetime FdV (in h)

FIG. 4 shows, a nomogram which gives the ratio $S_m/e_m$ (in mm$^2$.µm$^{-1}$) for stainless steel membrane as a function of the maximum allowable pressure $P_{max}$ (in bar) and the desired lifetime FdV (in h).

This figure shows that an aluminum membrane would require a surface area of the order of several m$^2$ with a thickness of the order of one µm, to obtain the desired result. Such a membrane cannot therefore be envisaged in practice in a supercapacitor.

EXAMPLE 2

This example illustrates an embodiment of the invention in which a selectively permeable membrane is placed directly in contact with an orifice made in the lid of a supercapacitor.

Figure 6:
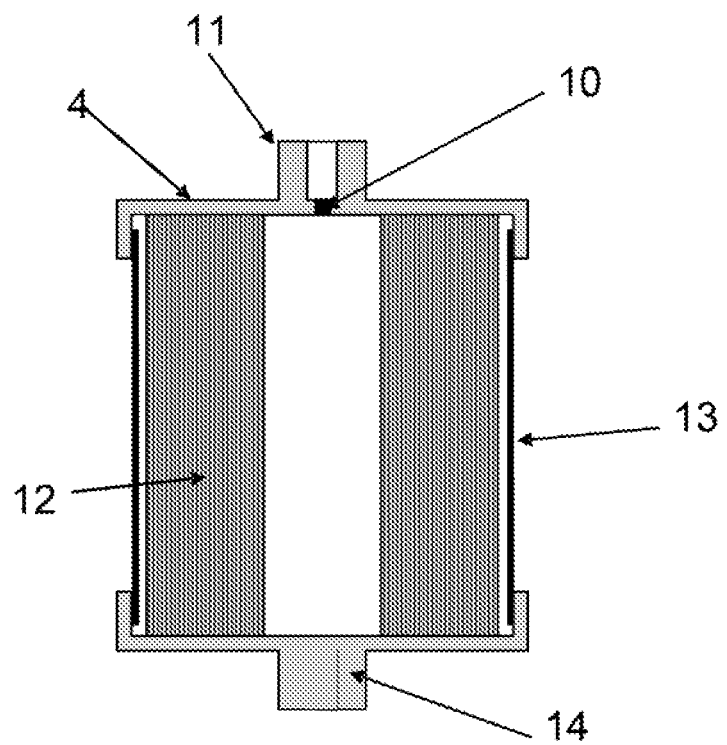
FIG. 6 represents a schematic sectional view of a supercapacitor in accordance with one embodiment.

FIG. 6 represents a schematic sectional view of a supercapacitor. The supercapacitor comprises a cylindrical side wall 13, a lid 4 comprising an opening 10 on top of which there is a hollow stub 11, and a lid 14. The supercapacitor contains a coiled element 12, formed by winding an electrode/separator/ electrode multi-layer as described in Example 1. The orifice 10 is intended to discharge the hydrogen which is formed during operation of the supercapacitor.

In the embodiment of FIG. 6, the selectively permeable membrane is a frit of a suitable material, for example palladium, pressed into the orifice 10.

EXAMPLE 3

This example illustrates a lid similar to that of FIG. 6, with a different embodiment of the membrane.

Figure 7:
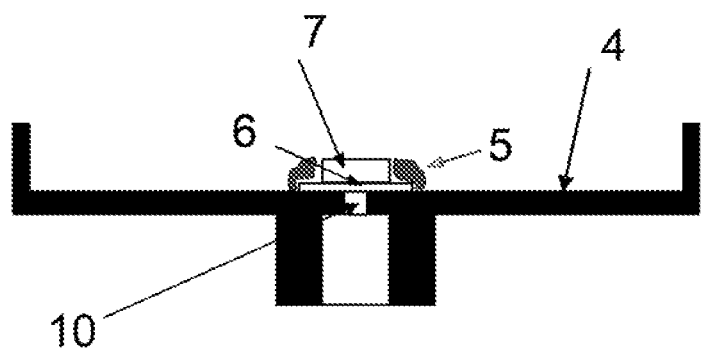
FIG. 7 illustrates a lid similar to that of FIG. 6, with a different embodiment of the membrane.

In FIG. 7, the lid 4 is represented during manufacture with its inner face on top. A palladium pellet 6 is placed on the central orifice 10, a layer 7 of a material to which the adhesive does not stick (for example EPDM) is placed over the pellet 6, and an adhesive 5 is applied in order to hold the material 7 and the pellet 6 on the lid 4. The material 7 is then removed, thus leaving the palladium free on both sides. The system formed by the adhesive 5 and the palladium pellet 6 remaining after removal of the material 7 is a system which is selectively permeable to hydrogen.

A leak test was carried out on a supercapacitor fitted with such a lid, in order to test the leaktightness of the chamber of the supercapacitor. The test was carried out by the so-called "aspersion method" according to the following operating procedure.

Helium is injected into the chamber of the supercapacitor before closing it, then it is placed under the intake of a turbomolecular pump integrated with a leak tester of the ASM142 type. Under these conditions, the helium molecules are small enough (molar mass 4 g.mol$^{-1}$) to be able to infiltrate rapidly into the micro-openings, cracks and pores of the casing of the element.

A measurement cell is mounted in series with the turbomolecular pump; it consists of a magnetic deflection mass spectrometer specifically set up to detect the He$^{2+}$ ions produced by ionization of the helium atoms in the cell. The stream of helium ions detected in this way is converted into an overall leakage rate (through the cracks, pores and micro-openings of the chamber of the supercapacitor). The leak is expressed in mbar.l/s. It represents the quantity of helium which escapes from the supercapacitor. The results are given in the table below, for a control test (without a membrane to prevent overpressure) and the 5 tests with a membrane according to the invention, formed by a pellet of palladium. The leakage level is so low that the chamber can be regarded as leaktight to helium and a fortiori other gases consisting of entities larger than helium, and that hydrogen will be removed only through the selective membrane.

|  | Test No | | | | | |
|---|---|---|---|---|---|---|
|  | Control | 1 | 2 | 3 | 4 | 5 |
| Leak (mbar · l/s) | 1.5 10$^{-9}$ | 2.2 10$^{-9}$ | 1.9 10$^{-9}$ | 2.6 10$^{-9}$ | 1.9 10$^{-9}$ | 4.2 10$^{-9}$ |

EXAMPLE 4

Figure 8:
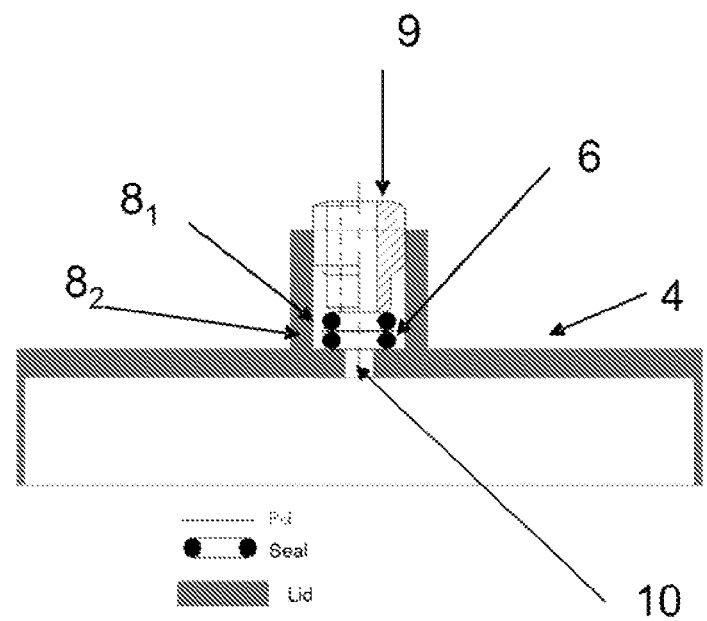
FIG. 8 illustrates a lid similar to that in FIG. 6 with a different embodiment of the membrane.

This example, which is represented in FIG. 8, illustrates a lid similar to that in FIG. 6 with a different embodiment of the membrane.

FIG. 8 represents a lid 4 of a supercapacitor (with the inner face underneath), a "seal 8$_1$/palladium pellet 6/seal 8$_2$" assembly placed on a central orifice of the lid, and a screw 9 which holds the assembly on top of the orifice 10.

In order to confirm leaktightness of the system, a leak test was carried out on 4 lids fitted with a device to prevent overpressure according to FIG. 7. The "leak" is expressed in mbar.l/s.

|  | Test No | | | | |
|---|---|---|---|---|---|
|  | Control | 1 | 2 | 3 | 4 |
| Leak (mbar · l/s) | 4.6 10$^{-9}$ | 3.4 10$^{-9}$ | 4.9 10$^{-9}$ | 3.00 10$^{-9}$ | 3.90 10$^{-9}$ |

A supercapacitor having a capacitance of 2600 F, comprising a device to prevent overpressure according to the present example, produced using a palladium pellet having a thickness of 100 µm and a diameter of 3 mm, exhibited a lifetime of 2000 hours. For comparison, a similar supercapacitor without a device to prevent overpressure exhibited a lifetime of 1000 hours, the two supercapacitors being used under the same conditions.

EXAMPLE 5

Figure 9:
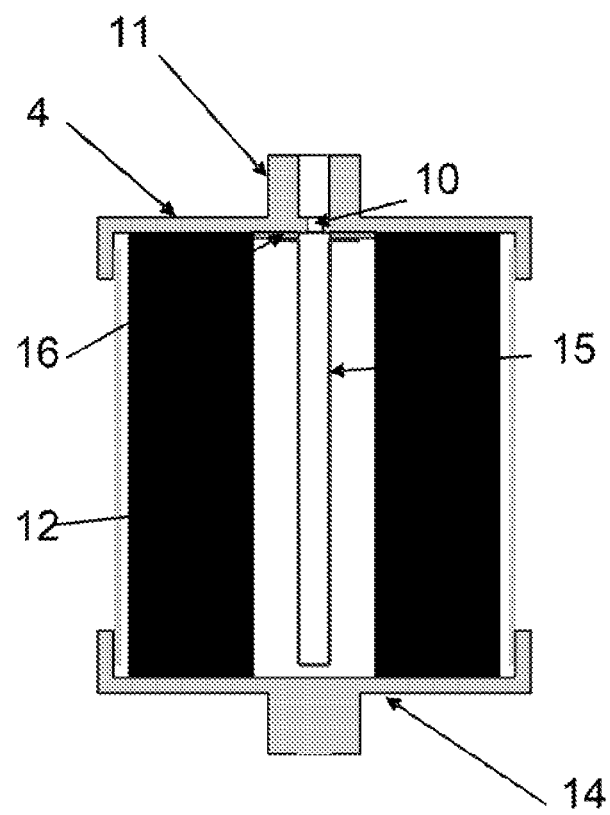
FIG. 9 illustrates an embodiment of a tubular membrane in accordance with one embodiment.

This example illustrates an embodiment of a tubular membrane as represented in FIG. 9.

FIG. 9 represents a schematic sectional view of a supercapacitor. The supercapacitor comprises a cylindrical side wall 13, base 14 and a lid 4 comprising an opening 10 on top of which there is a hollow stub 11; it also contains a coiled element 12 similar to that of Example 1. The orifice 10 is intended to discharge the hydrogen which is formed during operation of the supercapacitor.

The membrane is formed by a tube 15 which is closed at one of its ends and open at the other end. The open end faces the opening 10 in the lid 4. The tube 15 comprises a collar 16 around its open end, by which it is adhesively bonded against the inner wall of the lid around the opening 10 with the aid of an insulating adhesive. The tube consists of a sheet of a suitable material, for example a sheet of palladium.

This embodiment substantially increases the surface area S of the membrane. It thus makes it possible to increase the thickness of the membrane in order to improve its mechanical strength, and/or to increase the volume of hydrogen exchanged.

The invention claimed is:

1. A supercapacitor comprising;
    a closed chamber which is equipped with means for exchanging a gas with the external environment; and
    in which two electrodes, each carrying a layer of activated carbon having a high specific surface area are placed while being separated by a separator, the separator and the electrodes being impregnated with an electrolyte,
    wherein the means for exchanging a gas has a membrane which is permeable to hydrogen and its isotopes and impermeable to gas species which have a cross section greater than or equal to 0.3 nm, at a temperature of between −50° C. and 100° C., and
    in that the membrane has a surface area S (in $m^2$) and a thickness e (in m), and in that it includes a material which is selected from the group consisting of metals and metal alloys, and the intrinsic permeability $\Phi$ of which (in $mol.m^{-1}.s^{-1}Pa^{-1/2}$) is selective with respect to hydrogen and has a value such that $10^{-15}$ $mol.s^{-1}.Pa^{-1/2} \leq (\Phi*S)/e \leq 10^{-9}$ $mol.s^{-1}.Pa^{-1/2}$.

2. The supercapacitor as claimed in claim 1, wherein $10^{-12}$ $mol.s^{-1}.Pa^{-1/2} \leq (\Phi*S)/e \leq 5\ 10^{-10}$ $mol.s^{-1}.Pa^{-1/2}$.

3. The supercapacitor as claimed in claim 1, wherein the metals are selected from the group consisting of Pd, Nb, V, Ta, Ni and Fe and in that the metal alloys are selected from the group consisting of the alloys of a metal selected from among Pd, Nb, V and Ta and at least one other metal selected from the group consisting of Pd, Nb, V, Ta, Fe, Al, Cu, Ru, Re, Rh, Au, Pt, Ag, Cr, Co, Sn, Zr, Y, Ni, Ce, Ti, Ir and Mo.

4. The supercapacitor as claimed in claim 1, wherein on at least one of its surfaces the membrane carries an additional layer of a hydrogen-permeable material whose limits do not extend beyond the limits of the membrane.

5. The supercapacitor as claimed in claim 4, wherein the membrane carries two additional layers of the same hydrogen-permeable material or two additional layers of different materials.

6. The supercapacitor as claimed in claim 4, the hydrogen-permeable material of the additional layer or layers is selected from the group consisting of polymers, ceramics, carbon and metals.

7. The supercapacitor as claimed in claim 4, wherein the hydrogen-permeable material of the additional layer or layers is a metal or a metal alloy, in that the membrane has a surface area of from 0.0007 $mm^2$ to 100 $mm^2$ and a thickness of from 0.03 μm to 10 μm, and in that the ratio S/e varies from 0.025 $mm^2$/μm to 0.1 $mm^2$/μm.

8. The supercapacitor as claimed in claim 7, wherein the hydrogen-permeable material of the additional layer or layers is palladium, in that the membrane has a surface area of from 0.0015 $mm^2$ to 1 $mm^2$, and in that the ratio S/e varies from 0.05 $mm^2$/μm to 0.1 $mm^2$/μm.

9. The supercapacitor as claimed in claim 4, wherein at least one of the elements among the membrane and the additional layer or layers is a sintered material.

10. The supercapacitor as claimed in claim 9, wherein at least one additional layer is a sintered material having a thickness of more than 0.3 mm, and in that the membrane is a membrane made of palladium or a palladium-silver alloy having a thickness of from 0.03 μm to 10 μm and a surface area of from 0.0015 $mm^2$ to 10 $mm^2$, and in which the ratio S/e varies from 0.05 $mm^2$/μm to 1 $mm^2$/μm.

11. The supercapacitor as claimed in claim 6, wherein the hydrogen-permeable material of the additional layer or layers is a polymer or a mixture of polymers having a thickness of more than 0.05 mm, and in that the membrane is a membrane made of palladium or a palladium-silver alloy having a thickness of from 0.03 μm to 1 μm and a surface area of from 0.003 $mm^2$ to 1 $mm^2$, and in which the ratio S/e varies from 0.09 $mm^2$/μm to 1 $mm^2$/μm.

12. The supercapacitor as claimed in claim 1, wherein the membrane is a self supported membrane.

13. The supercapacitor as claimed in claim 12, wherein the membrane has a thickness greater than or equal to 5 μm.

14. The supercapacitor as claimed in claim 12, wherein the membrane has a surface area of between 0.15 $mm^2$ and 100 $mm^2$ and a thickness of from 5 μm to 100 μm, and in that the ratio S/e varies from 0.03 $mm^2$/μm to 1 $mm^2$/μm.

15. The supercapacitor as claimed in claim 13, wherein the membrane is a palladium membrane, in that it has a surface area of between 0.25 $mm^2$ and 10 $mm^2$, and in that the ratio S/e varies from 0.05 $mm^2$/μm to 0.1 $mm^2$/μm.

16. The supercapacitor as claimed in claim 15, wherein said palladium membrane has a thickness of 25 μm and a surface area of 1.5 $mm^2$, and in that the ratio S/e is 0.06 $mm^2$/μm.

17. The supercapacitor as claimed in claim 12, wherein the membrane consists of a film of a metal selected from the group consisting of Nb, V and Ta having a thickness greater than or equal to 5 μm, placed between two continuous palladium films having a thickness of less than 1 μm.

18. The supercapacitor as claimed in claim 1, wherein the membrane is a non-self supported membrane consisting of a palladium or nickel film having a thickness of less than 5 μm.

19. The supercapacitor as claimed in claim 1, wherein the membrane is a non-self supported membrane consisting of a film of a metal selected from among Nb, V, Ta, and Fe, having a thickness of less than 5 μm, placed between two continuous palladium films having a thickness of less than 1 μm.

20. The supercapacitor as claimed in claim 3, wherein the alloy is selected from the group consisting of $Pd_{75}Ag_{25}$, $Pd_{92}Y_8$, $Pd_{93.5}Ce_{6.5}$, $Pd_{60}Cu_{40}$, $V_{85}Ni_{15}$ stabilized with 0.05% yttrium or titanium, $V_{53}Ti_{26}Ni_{21}$, $V_{50}Nb_{50}$, $V_{13}Cr_{11}Al_3Ti_{73}$, $Nb_{56}Ti_{23}Ni_{21}$, $Nb_{68}Ti_{17}Ni_{15}$ and $Nb_{99}Zr_1$.

21. The supercapacitor as claimed in claim 1, wherein the membrane is a metal tube which is closed at one of its ends, open at the other end and placed in the chamber so that its open end is fixed to the means for exchanging a gas.

22. The supercapacitor as claimed in claim 1, wherein the means for exchanging a gas are in the form of an opening in the chamber.

23. The supercapacitor as claimed in claim 22, wherein the membrane consists of a pellet of metal or a metal alloy, which is fixed around said opening by welding, brazing, diffusion brazing or crimping.

* * * * *